(12) United States Patent
Mair et al.

(10) Patent No.: US 9,038,707 B2
(45) Date of Patent: May 26, 2015

(54) METHOD FOR PRODUCING A TRAILING ARM OF A TWIST BEAM AXLE IN WHICH A DRIVE UNIT OF AN ELECTRICAL DRIVE CLOSE TO THE WHEEL, COMPRISING AN ELECTRICAL ENGINE AND A TRANSMISSION, IS INTEGRATED

(75) Inventors: Ulrich Mair, Friedrichshafen (DE); Stephan Pollmeyer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/240,408

(22) PCT Filed: Aug. 2, 2012

(86) PCT No.: PCT/EP2012/065109
§ 371 (c)(1),
(2), (4) Date: Feb. 24, 2014

(87) PCT Pub. No.: WO2013/034372
PCT Pub. Date: Mar. 14, 2013

(65) Prior Publication Data
US 2014/0209266 A1 Jul. 31, 2014

(30) Foreign Application Priority Data
Sep. 9, 2011 (DE) .......................... 10 2011 082 390

(51) Int. Cl.
*B22D 25/02* (2006.01)
*B60G 21/05* (2006.01)
(Continued)

(52) U.S. Cl.
CPC .............. *B60G 9/003* (2013.01); *B60K 7/0007* (2013.01); *B22D 25/02* (2013.01); *B60G 21/051* (2013.01); *B60G 2206/20* (2013.01); *B60G 2206/8101* (2013.01); *B60G 2300/50* (2013.01)

(58) Field of Classification Search
CPC ....... B22D 25/02; B60G 21/051; B60G 9/003; B60K 7/0007
USPC ............. 164/137, 369; 180/56, 60, 62, 65.51, 180/905
See application file for complete search history.

(56) References Cited

U.S. PATENT DOCUMENTS

| | | | |
|---|---|---|---|
| 7,753,384 B2 | 7/2010 | Kunze et al. | |
| 2010/0187788 A1* | 7/2010 | Choi et al. | 280/124.106 |
| 2012/0292978 A1 | 11/2012 | Buschjohann et al. | |

FOREIGN PATENT DOCUMENTS

| | | |
|---|---|---|
| DE | 195 42 523 A1 | 5/1997 |
| DE | 198 40 134 A1 | 3/2000 |

(Continued)

OTHER PUBLICATIONS

German Search Report Corresponding to 10 2011 082 390.5 mailed Jun. 6, 2012.
(Continued)

*Primary Examiner* — Kevin E Yoon
(74) *Attorney, Agent, or Firm* — Davis & Bujold, P.L.L.C.; Michael J. Bujold

(57) ABSTRACT

A method of producing a trailing arm of a torsion beam axle in which an integrated drive unit of a wheel-adjacent electric drive has an electric machine and a transmission. By using the method, the trailing arm is produced in the form of a casting with a box profile. The contours for producing the area that accommodates the transmission, the connection point to the vehicle body, the bore that receives the cross-member which connects the two trailing arms to one another, the U-profile of the trailing arm, the box profile and the area that accommodates the electric machine, are modeled by cores such that the contours for producing the connection point of the trailing arm to the vehicle body, the bore that receives the cross-member and the U-profile of the trailing arm are modeled by one core.

5 Claims, 3 Drawing Sheets

(51) Int. Cl.
*B60K 7/00* (2006.01)
*B60G 9/00* (2006.01)

(56) References Cited

FOREIGN PATENT DOCUMENTS

| DE | 101 14 466 A1 | 9/2002 |
| DE | 10 2004 014 610 A1 | 10/2005 |
| DE | 10 2011 009 040 A1 | 8/2011 |
| GB | 2 396 140 A | 6/2004 |
| WO | 2008/004715 A1 | 1/2008 |
| WO | 2008/027159 A2 | 3/2008 |

OTHER PUBLICATIONS

International Search Report Corresponding to PCT/EP2012/065109 mailed Oct. 30, 2012.
Written Opinion Corresponding to PCT/EP2012/065109 mailed Oct. 30, 2012.

* cited by examiner

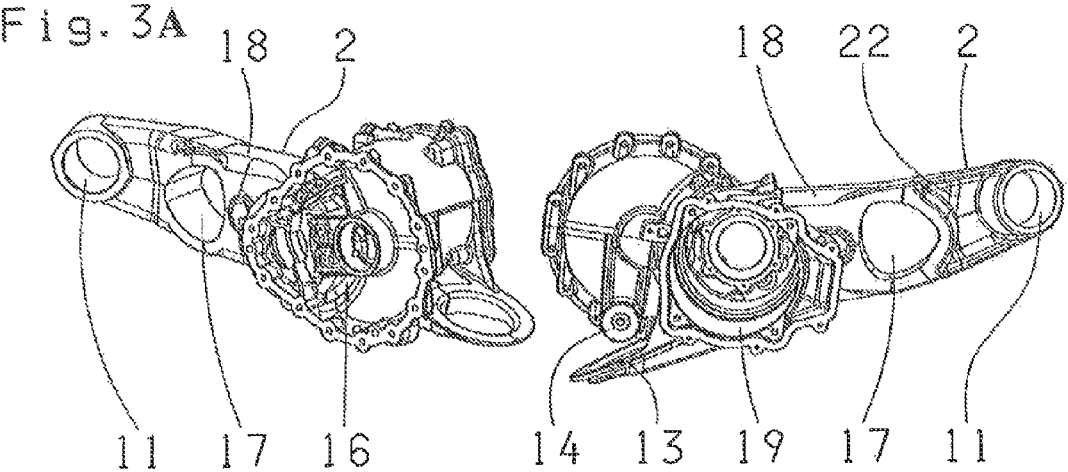
Fig. 3A
Fig. 3
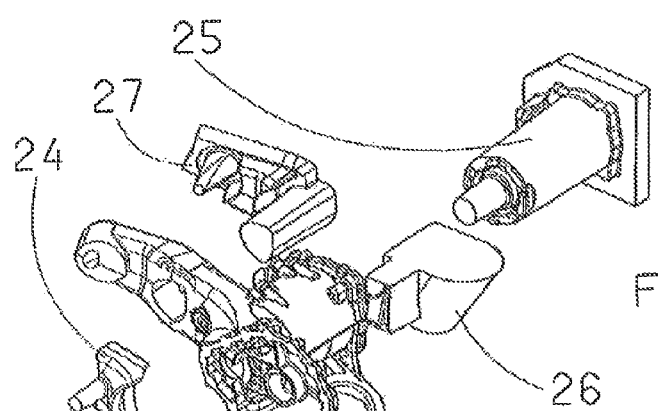
Fig. 4A
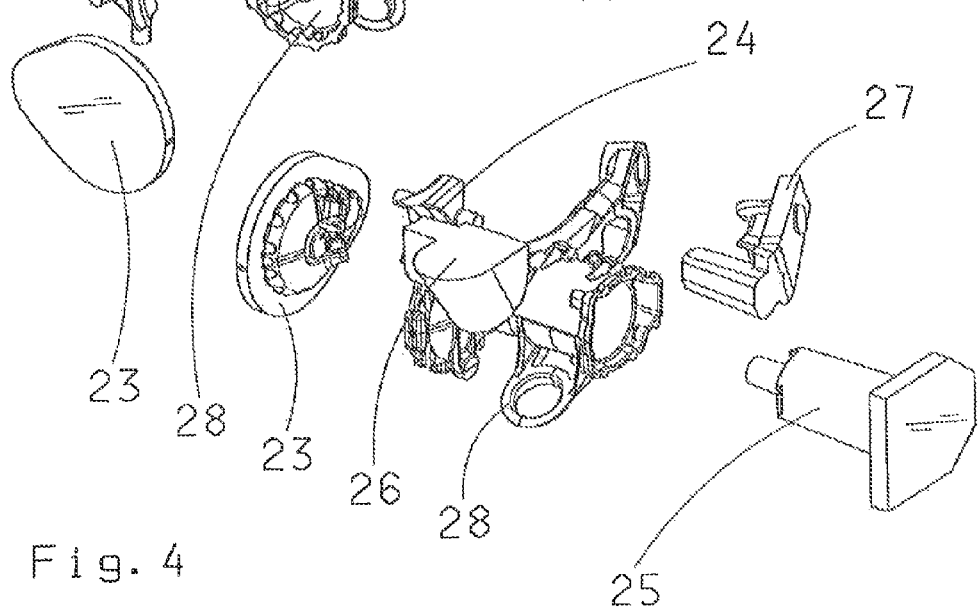
Fig. 4

– 1 –

METHOD FOR PRODUCING A TRAILING ARM OF A TWIST BEAM AXLE IN WHICH A DRIVE UNIT OF AN ELECTRICAL DRIVE CLOSE TO THE WHEEL, COMPRISING AN ELECTRICAL ENGINE AND A TRANSMISSION, IS INTEGRATED

This application is a National Stage completion of PCT/EP2012/065109 filed Aug. 2, 2012, which claims priority from German patent application serial no. 10 2011 082 390.5 filed Sep. 9, 2011.

FIELD OF THE INVENTION

The present invention relates to a method for producing a trailing arm of a twist beam axle in which a drive unit of an electrical drive close to the wheel, comprising an electrical engine and a transmission, is integrated.

BACKGROUND OF THE INVENTION

Torsion beam axles of the prior art comprise two trailing arms connected to one another by a cross-member. The trailing arms are each connected to a wheel carrier of a wheel of the torsion beam axle.

From the prior art, wheel-adjacent electric drives for driving a wheel of a driven axle in electrically driven vehicles are known, which are fixed on brackets, in this case being attached to the chassis members, for example on the torsion beam. By virtue of this design the unsprung mass is reduced since the electric drives are arranged close to the connection point of the beam to the vehicle body.

In addition, in the case of wheel-adjacent electric drives for driving a wheel of a driven axle, it is known from the prior art to integrate the electric machine and the transmission in the trailing arm of the torsion beam axle associated with the wheel concerned. By virtue of a high gear ratio of the transmission connected between the electric machine and the driven wheel, the electric machine can be designed very compactly so that it can be integrated in the trailing arm. Furthermore, the electric machines are preferably designed for high-torque rotation so that a high power-to-weight ratio (kW/kg) of the drive unit and small electric machine dimensions are obtained.

Moreover, from the prior art it is known to integrate the connection of the damper associated with the wheel and the spring associated with the wheel in the trailing arm.

Advantageously, the use of wheel-adjacent electric drives for driving a wheel of a driven axle in the vehicle body results in greater flexibility, since omitting the central drive in the middle of the vehicle provides additional degrees of freedom in the design of the vehicle, especially in the design of the vehicle's interior space, the battery accommodation area and the crash safety provisions.

Moreover, by virtue of wheel-adjacent electric drives, drive torques can be produced individually for each wheel, whereby functions such as torque vectoring, ESP, ABS, ASR, etc. can be realized in a simple manner. Thanks to the ability of electric drives to be controlled more rapidly and more exactly compared with conventional brake-based control systems, these functions can be optimized.

SUMMARY OF THE INVENTION

The purpose of the present invention is to indicate a method for producing a trailing arm of a torsion beam axle in which a drive unit of a wheel-adjacent electric drive comprising an electric machine and a transmission is integrated, the implementation of which method enables inexpensive production.

Accordingly, it is proposed to make the trailing arm in the form of a casting with a box profile, wherein, to minimize the finish-machining work on the casting, the contours for producing the area that accommodates the transmission, the connection point to the vehicle body (A-mounting), the bore that receives the cross-member, the U-profile of the trailing arm, the box profile and the area for accommodating the electric machine, are modeled by cores. In the case when the connection of the wheel-associated damper and the spring cup of the wheel-associated spring are integrated in the trailing arm, the contours for producing the spring cup for receiving the spring and the damper connection are also modeled by cores.

According to the invention it is proposed to model the contours for producing the connection point of the trailing arm to the vehicle body, the bore that receives the cross-member and the U-profile of the trailing arm, in one core.

In addition, when the connection of the wheel-associated damper and the spring cup of the wheel-associated spring are integrated in the trailing arm, it is proposed to model the contours for producing the spring cup for receiving the spring and the damper connection, in a further core.

By virtue of the concept according to the invention, namely that of combining individual cores, the total number of cores required for producing the trailing arm is significantly reduced. For example, in the case when the connection of the wheel-associated damper and the spring cup of the wheel-associated spring are integrated in the trailing arm, instead of eight individual cores only five cores are needed.

BRIEF DESCRIPTION OF THE DRAWINGS

Below, an example of the invention is explained in further detail with reference to the attached figures, which show:

FIGS. 3 and 3A: Two perspective views of the trailing arm shown in FIGS. 2 and 2A without the housing on the wheel side, to make clear the contours to be modeled by cores;

FIGS. 4 and 4A: Two perspective views of the cores needed according to the invention for producing a trailing arm as in FIGS. 2 and 2A.

DETAILED DESCRIPTION OF THE PREFERRED EMBODIMENTS

Figure 1:
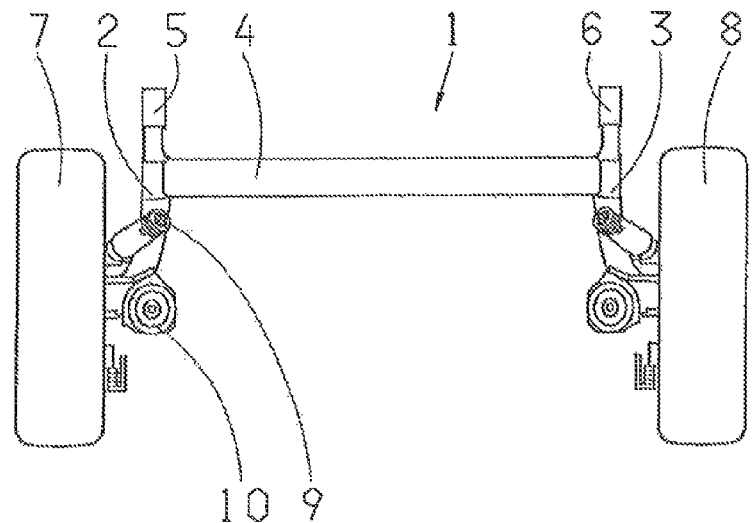
FIG. 1: A schematic view from above, of a rear torsion beam axle according to the prior art.

The invention will be explained with reference to a rear torsion beam axle, since that is the most widely used rear axle design in the small-car sector. Referring to FIG. 1, a torsion beam axle 1 of the prior art comprises two trailing arms 2, 3 connected to one another by a cross-member 4.

The torsion beam axle 1 is connected to the body of the vehicle by two rubber mountings 5, 6. In FIG. 1 the wheels of the torsion beam axle 1 are indexed 7 and 8. In addition, in the attached FIG. 1 a damper is indexed 9 and a spring cup of the torsion beam axle 1 is indexed 10.

Figures 2, 2A:
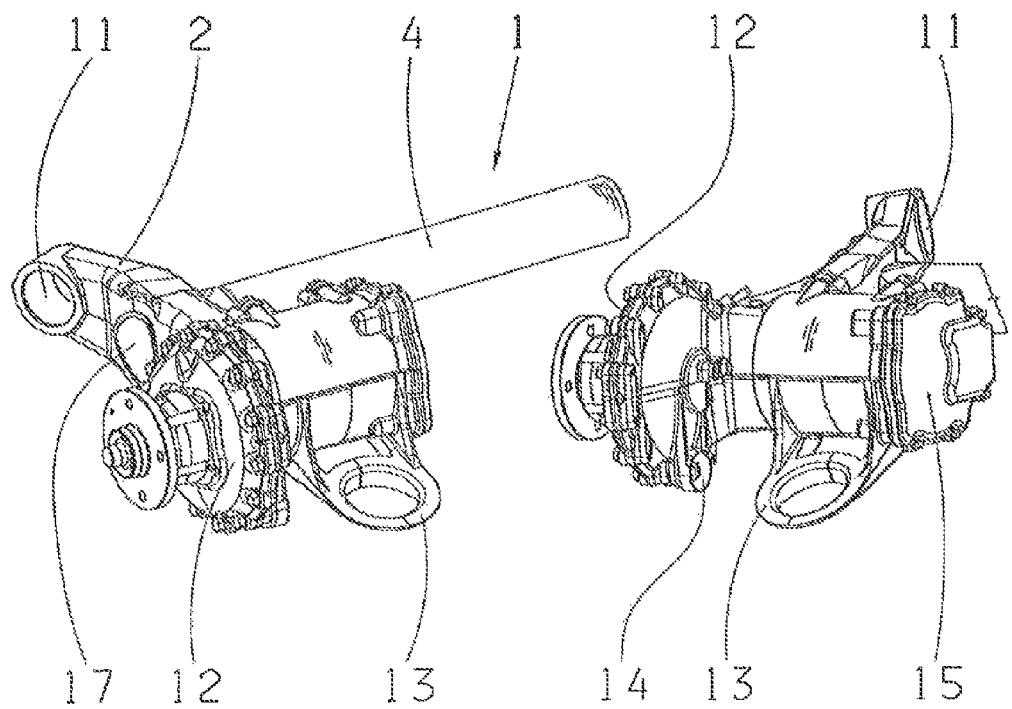
FIGS. 2 and 2A: Two perspective views of a trailing arm of a torsion beam axle, in which a drive unit of a wheel-adjacent electric drive is integrated, wherein the housing on the wheel side is bolted to the trailing arm.

FIGS. 2 and 2A show two perspective views of a trailing arm 2 of a torsion beam axle 1, in which a drive unit of a wheel-adjacent electric drive comprising an electric machine and a transmission is integrated.

In the example shown in FIGS. 2 and 2A, the housing 12 on the wheel side is bolted to the trailing arm 2. In this case the wheel and the brake are fixed onto the wheel-side housing 12. As can be seen in FIGS. 2 and 2A, the trailing arm 2 has a connection point 11 for its attachment to the vehicle body, a connection 14 for a damper and a spring cup 13 for receiving a spring. A cover of the electric machine is indexed 15. In addition, the bore that receives the cross-member 4 is indexed 17.

According to the invention, and referring to FIGS. 3 and 3A, the trailing arm 2 is made in the form of a casting with a box profile 18, wherein the contours for producing the area 16 that accommodates the transmission, which in the example shown is a spur gear transmission, the connection point 11 to the vehicle body, the bore 17 that receives the cross-member 4, the U-profile 22 of the trailing arm 2, the box profile 18, the area 19 that accommodates the electric machine, the spring cup 13 for receiving the spring, and the damper connection 14 are modeled by cores, whereby the finish-machining work to be done on the casting is reduced to a minimum.

According to the invention, it is also proposed to model the contours for obtaining the connection point 11 of the trailing arm 2 to the vehicle body, the bore 17 that receives the cross-member 4 and the U-profile 22 of the trailing arm 2 in one core, and the contours for obtaining the spring cup 13 that receives the spring and the damper connection 14 in a further core. Advantageously, this reduces the number of cores needed to only five, which are shown in FIGS. 4 and 4A.

FIGS. 4 and 4A shows the core for modeling the area 16 that accommodates the transmission, which is indexed 23, the core for modeling the box profile, which is indexed 24, the core for modeling the area 19 that accommodates the electric machine, which is indexed 25, the combined core for modeling the spring cup 13 that receives the spring and the damper connection 14, which is indexed 26, and the combined core for modeling the connection point 11 of the trailing arm 2 to the vehicle body, the bore 17 that receives the cross-member 4, and the U-profile 22 of the trailing arm 2, which is indexed 27. In addition, in FIGS. 4 and 4A the casting to be produced is indexed 28.

Figure 5A:
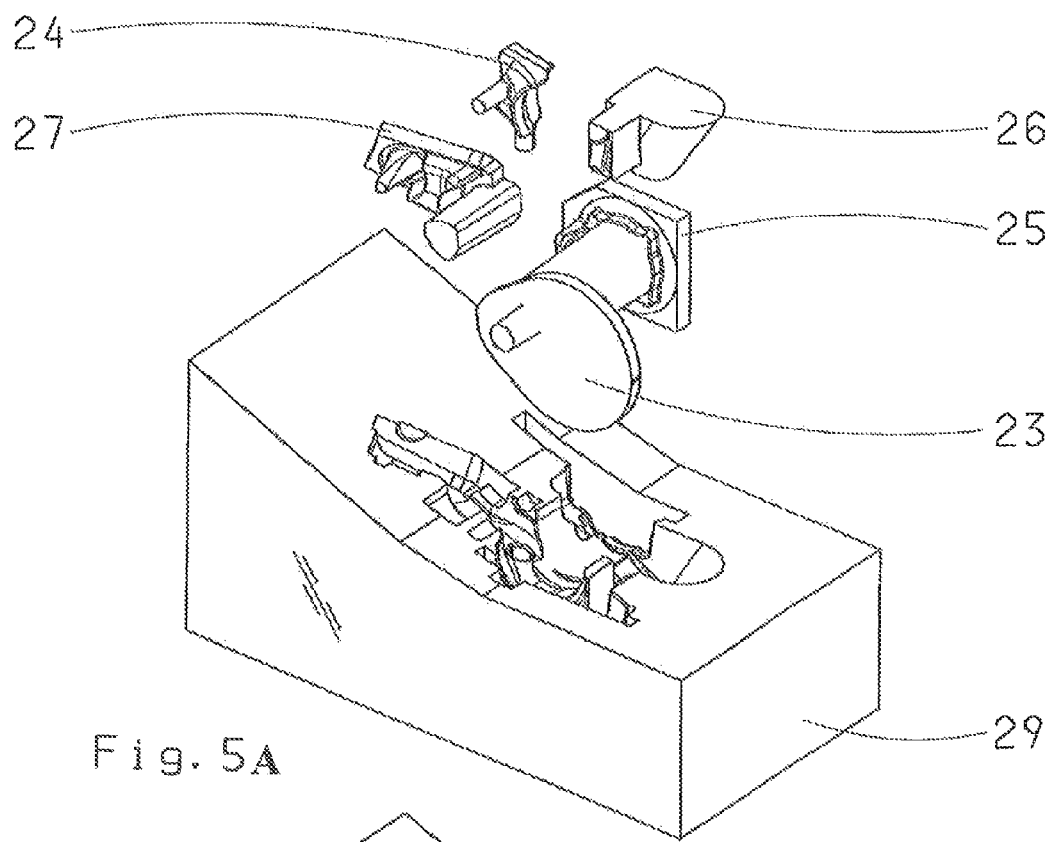
FIGS. 5 and 5A: Two perspective views of the lower molding box for producing a trailing arm as in FIGS. 2 and 2A, showing on the left of the figure the lower molding box without any cores positioned in it, and on the right the molding box with the cores in position.
Figure 5:
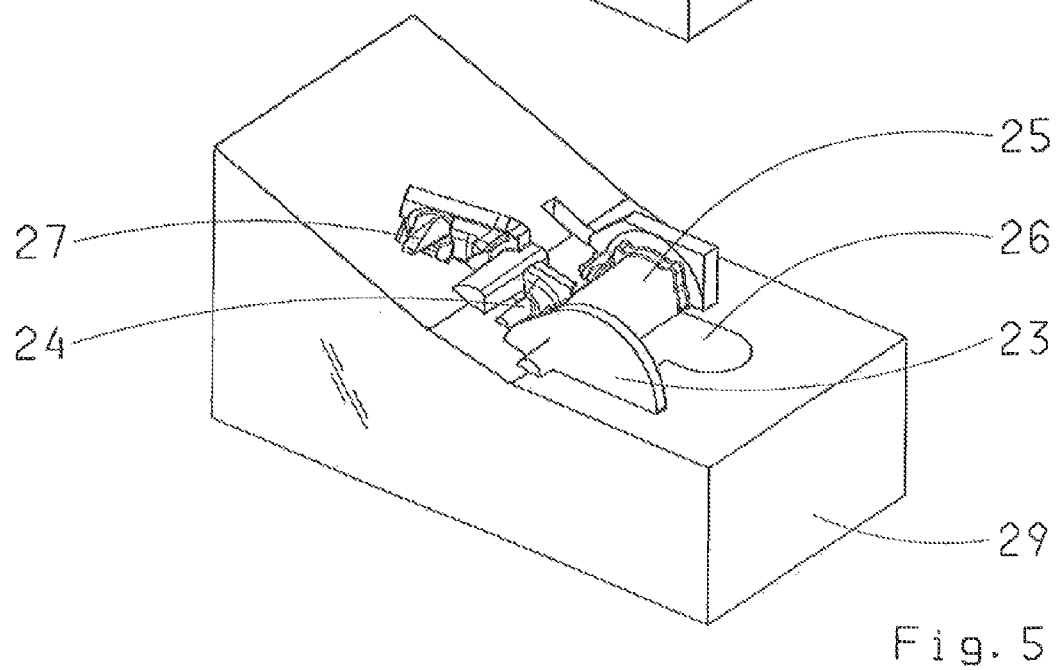

The object represented in FIGS. 5 and 5A is the lower molding box 29 for producing a trailing arm 2, with a view to making clear the cores needed according to the invention. The left part of FIG. 5 shows the cores to be positioned in the lower molding box 29, namely the core 23 for modeling the area 16 that accommodates the transmission, the core 24 for modeling the box profile 18, the core 25 for modeling the area 19 that accommodates the electric machine, the core 26 for modeling the spring cup 13 that receives the spring and the damper connection 14, and the core 27 for modeling the connection point 11 of the trailing arm 2 to the vehicle body, the bore 17 that receives the cross-member 4 and the U-profile of the trailing arm 2. On the right in the figure these cores 23, 24, 25, 26 and 27 are shown in their positions in the molding box.

INDEXES

1 Torsion beam axle
2 Trailing arm
3 Trailing arm
4 Cross-member
5 Rubber mounting
6 Rubber mounting
7 Wheel
8 Wheel
9 Damper
10 Spring
11 Connection point for connecting the trailing arm to the body of the vehicle
12 Housing on the wheel side
13 Spring cup
14 Damper connection
15 Cover of the electric machine
16 Area that accommodates the transmission
17 Bore that receives the cross-member 4
18 Box profile
19 Area that accommodates the electric machine
22 U-profile of the trailing arm
23 Core for modeling the area 16 that accommodates the transmission
24 Core for modeling the box profile 18
25 Core for modeling the area 19 that accommodates the electric machine
26 Core for modeling the spring cup 13 that receives the spring and the damper connection 14
27 Core for modeling the connection point 11 of the trailing arm 2 to the vehicle body, the bore 17 that receives the cross-member 4 and the U-profile 22 of the trailing arm 2
28 Casting
29 Lower molding box

The invention claimed is:

1. A method of producing a trailing arm (2, 3) of a torsion beam axle (1) having an integrated drive unit of a wheel-adjacent electric drive which comprises an electric machine and a transmission, the method comprising the steps of:
    modeling, with a plurality of cores, contours for producing an area (16) that accommodates the transmission, a connection point (11) to a vehicle body, a bore (17) that receives a cross-member (4) which connects two trailing arms (2, 3) to one another, a U-profile (22) of the trailing arm (2), a box profile (18) and an area (19) that accommodates the electric machine,
    modeling the contours for producing the connection point (11) of the trailing arm (2) to the vehicle body, the bore (17) that receives the cross-member (4) and the U-profile (22) of the trailing arm (2) are modeled from one core (27); and
    producing the trailing arm (2, 3), with the box profile (18), in a form of a casting (28) from the plurality of cores.

2. The method of producing the trailing arm (2, 3) of the torsion beam axle (1) according to claim 1, further comprising the step of, when a damper connection (14) of the wheel-associated damper and a spring cup (13) of the wheel-associated spring are integrated in the trailing arm (2), modeling contours for producing the spring cup (13), that receives a spring, and the damper connection (14) from another core (26).

3. A method of producing a trailing arm of a torsion beam axle of a vehicle such that the trailing arm accommodates an integrated drive unit comprising an electric machine and a transmission, adjacent to a wheel of the vehicle, and the trailing arm comprising an area that accommodates the transmission, an area that accommodates the electric machine, a connection point for connecting the trailing arm to a body of the vehicle, a bore for receiving an end of a cross-member of the torsion beam axle, and a U-profile, the method comprising the steps of:
    modeling, from a first core, a contour for producing the area that accommodates the transmission;

modeling, from a second core, a contour for producing the box profile of the trailing from a third core, a contour for producing the area that accommodates the electric machine;

modeling, from a fourth core, contours for producing:
 the connection point for connecting the trailing arm to the body of the vehicle, and
 the bore that receives the end of the cross-member of the torsion beam axle, and the U-profile of the trailing arm; and producing the trailing arm with a box profile by using the first through the fourth cores.

4. The method of producing the trailing arm of the torsion beam axle according to claim 3, further comprising the step of:
 modeling, from a fifth core, contours for producing:
  a spring cup that receives a wheel-associated spring, and
  a damper connection for connecting a wheel-associated damper to the tailing arm.

5. The method of producing the trailing arm of the torsion beam axle according to claim 4, further comprising the step of combining the first, the second, the third, the fourth and the fifth cores in a molding box to model the trailing arm comprising:
 the box profile,
 the area that accommodates the transmission,
 the area that accommodates the electric machine,
 the connection point for connecting the trailing arm to the body of he vehicle,
 the bore that receives an end of the cross-member of the torsion beam axle,
 the U-profile, the spring cup that receives the wheel-associated spring, and
 the damper connection for connecting the wheel-associated damper to the tailing arm.

* * * * *